(12) United States Patent
Bredolt et al.

(10) Patent No.: US 6,351,510 B1
(45) Date of Patent: Feb. 26, 2002

(54) NUCLEAR PLANT

(75) Inventors: Ulf Bredolt, Västerås ; Johan Engström, Stockholm; Bengt Ivung, Västerås , all of (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/367,893

(22) PCT Filed: Mar. 6, 1998

(86) PCT No.: PCT/SE98/00406

§ 371 Date: Sep. 14, 1999

§ 102(e) Date: Sep. 14, 1999

(87) PCT Pub. No.: WO98/39978

PCT Pub. Date: Sep. 11, 1998

(30) Foreign Application Priority Data

Mar. 7, 1997 (SE) ................................. 9700822

(51) Int. Cl.$^7$ ............................................ G21C 13/028
(52) U.S. Cl. ..................... 376/205; 376/203; 376/206; 376/283; 376/461
(58) Field of Search ................................. 376/282, 283, 376/340, 461, 260, 268, 203, 205, 206

(56) References Cited

U.S. PATENT DOCUMENTS

| 3,865,688 A | | 2/1975 | Kleimola ..................... 176/37 |
|---|---|---|---|
| 3,984,282 A | * | 10/1976 | Kleimola ..................... 176/38 |
| 4,747,993 A | * | 5/1988 | Hankinson et al. ......... 376/205 |
| 4,780,267 A | * | 10/1988 | Todt, Sr. et al. ............ 376/254 |
| 4,801,422 A | * | 1/1989 | Turner et al. ................ 376/260 |
| 4,983,351 A | * | 1/1991 | Tower et al. ................ 376/254 |
| 5,169,596 A | * | 12/1992 | Orr ............................. 376/293 |
| 5,230,860 A | * | 7/1993 | Behnke et al. .............. 376/203 |
| 5,272,732 A | * | 12/1993 | Chiang ........................ 376/203 |
| 5,345,481 A | * | 9/1994 | Oosterkamp ................ 376/293 |
| 5,359,632 A | * | 10/1994 | Bottoms et al. ............ 376/203 |
| 5,377,243 A | * | 12/1994 | Hill ............................. 376/283 |
| 5,784,426 A | * | 7/1998 | Burner et al. ............... 376/260 |

FOREIGN PATENT DOCUMENTS

| CH | 501 983 | | 2/1971 | |
|---|---|---|---|---|
| CH | 501983 | * | 2/1971 | ............ G21C/9/00 |
| EP | 0 734 028 | | 3/1996 | |
| EP | 0734028 A1 | * | 3/1996 | ............ G21C/15/18 |
| FI | 54 422 | | 7/1978 | |

* cited by examiner

Primary Examiner—Michael J. Carone
Assistant Examiner—John Richardson
(74) Attorney, Agent, or Firm—Connolly Bove Lodge & Hutz, LLP

(57) ABSTRACT

A nuclear power plant comprising a casing which encloses a primary space, a reactor vessel arranged in the primary space, and a reactor core provided in the reactor vessel. The plant further comprises an upper space provided above the casing. The reactor core is separated from the upper space by means of an openable cover arrangement. The casing is designed in such a manner that the primary space is completely closed against the environment to at least the level corresponding to the most highly located part of the reactor core. The upper space is arranged to house a volume of a liquid sufficiently large to permit the filling of the primary space with the liquid to a level located above the most highly located part of the reactor core.

8 Claims, 2 Drawing Sheets

NUCLEAR PLANT

THE BACKGROUND OF THE INVENTION

The present invention relates to a nuclear reactor plant comprising a casing enclosing a primary space, a reactor vessel arranged in the primary space, a reactor core provided in the reactor vessel, and an upper space provided above the primary space, the reactor core being separated from the upper space by means of an openable cover arrangement Such nuclear reactor plants are known and these have proved to function in a satisfactory manner. During shut-down of such a plant for revision and maintenance, the cover arrangement is removed. Consequently, the reactor core is completely submerged in water. It is of course important from a security point of view to be able to keep the water in the reactor vessel during the whole period of shut-down in order to prevent radiation from the reactor core from reaching the environment and in order to prevent the temperature of the reactor core from exceeding an unallowable level, which may lead to the melting of the reactor core.

During such a shut-down of the reactor and during certain types of service work at the reactor, such as for instance regarding the pumps provided at the bottom portion of the reactor vessel, it may under certain circumstances happen that water in He reactor vessel starts to leak In case of an unfortunate scenario, this may involve emptying of the reactor vessel by such an amount of water that the water level in the reactor vessel comes below the level of the reactor core. Furthermore, if the openings and passages, which normally are provided in the containment into the space below the reactor vessel, are not properly closed, the water leaking from the reactor vessel will, in addition, disappear out of the containment. It is to be noted that during shut-down and revision work, these openings and passages are normally open in order to give access to maintenance staff and transport of material.

At such a water loss in the reactor vessel, it might thus happen that the temperature in the reactor core rises to such a level that the core melts at an open reactor containment.

SUMMARY OF THE INVENTION

The object of the present invention is to remedy the problems mentioned above and in particular to provide a reactor plant by which a water loss in the reactor vessel may be prevented in a secure and passive manner.

This object is obtained by the nuclear reactor plant initially defined and characterized in that the casing is designed in such a manner that the primary space is completely closed against the environment at least to a level corresponding to the most highly located part of the reactor core, and that the upper space is arranged to house a volume of a liquid, which volume is sufficiently large to permit the filling of the primary space with the liquid to a level reaching at least the most highly located part of the reactor core. Since the casing according to the invention is completely closed at its lower part and thus does not comprise any openings or passages, the water which in case of an accident possibly may leak out from the primary space is prevented from leaving the casing below the most highly located part of the core. Since the openable cover arrangement is removed when the reactor plant is shut down for revision and maintenance, the liquid in the upper space will flow down into the reactor vessel. With the liquid volume available in the upper space, it is thus possible to ensure that the reactor core always will be submerged in liquid even if the bottom of the reactor vessel would be open. Consequently, it is possible by the measures according to the invention to prevent in a completely passive manner, i.e without the provision of any external force or measure, the uncovering of the reactor core.

According to an embodiment of the invention, the primary space is limited downwardly by a floor member and a cavity which is open upwardly and extends downwardly from the floor member, the reactor vessel at least partly being provided within the cavity. In such a manner, the volume of the primary space which surrounds the reactor vessel may be reduced. Thereby, the reactor vessel is advantageously provided in the primary space in such a manner that it extends downwardly into the cavity to such a level that the most highly located part of the reactor core is located in the cavity below the floor member. Such a cavity may be defined by a bottom portion and a wall portion which delimit completely the cavity from the surrounding parts of the casing up to the level at which the floor member is located. In such a manner, the cavity will be completely closed against surrounding parts of the spaces located within the casing, ie. the cavity lacks any passages through which water, which at an accident possibly may leak, may leave the cavity. However, at least one transport passage may extend between the lower part of the cavity and the part of the primary space located above the floor member. Such a transport passage may comprise means for the transport of people and material. In such a manner, the space below the reactor vessel is accessible and it is possible to perform work on reactor components located at the underside of the reactor vessel.

According to a further embodiment of the invention, the casing also encloses a secondary space which is separated from the primary space and provided below the floor member and arranged to house a cooling medium Thereby, at least one channel ma y extend through the floor member and connect the primary space and secondary space, the channel having an orifice provided in the secondary space and arranged to be located in the cooling medium.

According to a further embodiment of the invention, the primary space is accessible from outside via an openable passage extending through the casing at a level located above the floor member.

According to a further embodiment of the invention at least one reactor component is sealingly and releasably provided in a through-going opening at a bottom portion of the reactor vessel. Such a reactor component may comprise at least one of a pi device arranged to recirculate liquid in the interior of the reactor vessel, and a drive member arranged to displace a control rod into and out of the reactor core for controlling the nuclear reaction in the reactor core.

According to a further embodiment of the invention, the cover arrangement comprises a first cover arranged to close an upper limiting wall of the primary space and the second cover arranged to close the reactor vessel.

Further features and advantages of the nuclear reactor plant according to the invention appear from the following description of different embodiments.

BRIEF DESCRIPTION OF THE DRAWINGS

The present invention is now to be explained more closely by means of different embodiments, merely disclosed by way of example, and with reference to the drawings attached hereto.

DETAILED DESCRIPTION OF DIFFERENT EMBODIMENTS

Figure 1:
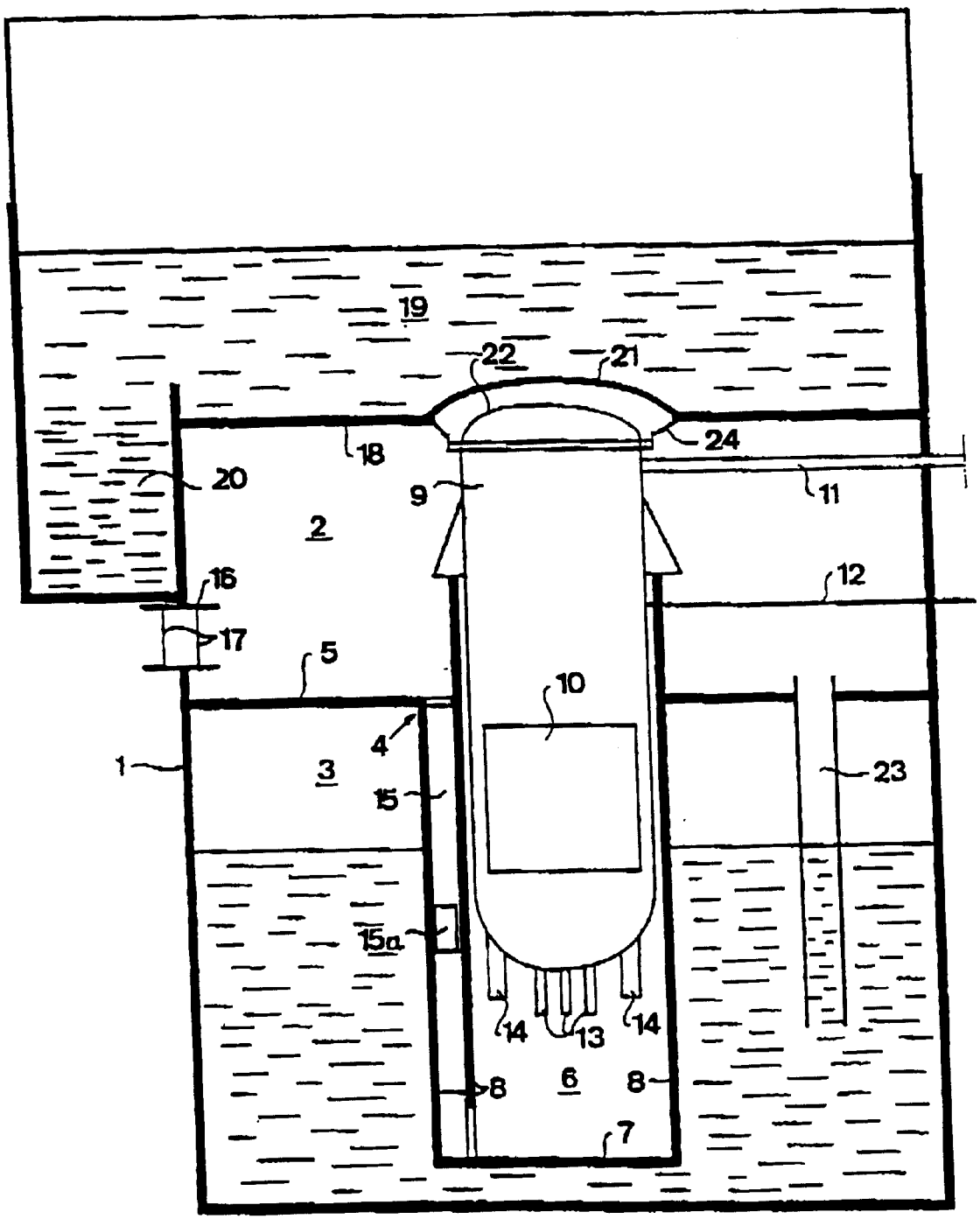
FIG. 1 discloses a Section through a nuclear reactor plant according to an embodiment of the invention in a normal operation situation.

FIG. 1 discloses schematically a nuclear reactor plant according to the present invention. The plant comprises a casing 1 enclosing a primary space 2 and a secondary space 3, which are separated from each other by means of a separating member 4 in the form of an intermediate wall. The separating member 4 forms a peripheral, essentially plane floor member 5 and a cavity 6 centrally provided and defined by a bottom portion 7 and a wall portion 8 extending around the bottom portion 7 and connecting the bottom portion 7 to the floor member 5. A reactor vessel 9 is provided in the primary space 2 and in such a manner that the reactor vessel 9 at least partly extends downwardly into the cavity 6. The reactor vessel 9 houses a reactor core 10 schematically disclosed. The nuclear reactor plant disclosed is of a so-called boiling water type and includes a steam conduit 11 extending out of the casing 1 to a turbine plant (not disclosed) for generating electrical energy. From the turbine plant, a feed water conduit 12 for the condensate extends through the casing back into the reactor vessel 9. Furthermore, a number of driving members 13, schematically disclosed, are provided at the bottom portion of the reactor vessel 9 and arranged to displace control rods (not disclosed) into and out of the reactor core 10 for controlling the nuclear reaction in the reactor core 10. Moreover, two pump devices 14 are disclosed, which are arranged to recirculate liquid in the interior of the reactor vessel 9.

The lower part of the cavity 6 is accessible via a transport passage 15 extending between the lowest part of the cavity 6 and the part of the primary space 2 located above the floor member 5. The transport passage 15 comprises means for transporting staff and material, for instance a schematically indicated elevator device 15a and a staircase (not disclosed).

The primary space 2 is accessible from outside via a passage 16 through the casing 1. The passage 16 comprises doors 17 permitting the opening and closing of the passage. It is to be noted that the casing 1 in accordance with the present invention comprises no openings or passages from the cavity 6, which are provided at a lower level than the one disclosed, i.e. all such openings are to be located above the floor member 5 and more closely above the most highly located part of the reactor core 10. Furthermore, according to the present invention, there is no opening or passage through the wall 8 and the floor 7 into the secondary space 3. When work is to be performed at the lower parts of the reactor vessel 9, staff and material thus are to be transported via the passage 16 and the transport passage 15 down to the lowest part of the cavity 6.

The casing 1 and the primary space 2 are upwardly limited by an upper limiting wall 18. Above this limiting wall 18, and thus above the casing 1, there is an upper space 19 housing a volume of a liquid. In the example disclosed, this upper 35 space 19 is connected to a pool 20 intended for temporary storing of fuel rods and located outside the casing 1. The interior of the reactor vessel .9, i.e. the reactor core ID, is accessible from the upper space 19 via an openable cover arrangement comprising a first dome-shaped cover 21 forming a part of the casing 1 and the upper limiting wall 1B, and a second dome-shaped cover 22 forming a part of the reactor vessel 9.

The secondary space 3 is arranged to house a cooling medium in the form of a liquid and is connected to the primary space 2 via a number of channels 23, one of which is disclosed in FIG. 1. The channel 23 extends through the floor member 5 and has an orifice in the secondary space 3, which is arranged to be located in the liquid present in the secondary space 3.

Figure 2:
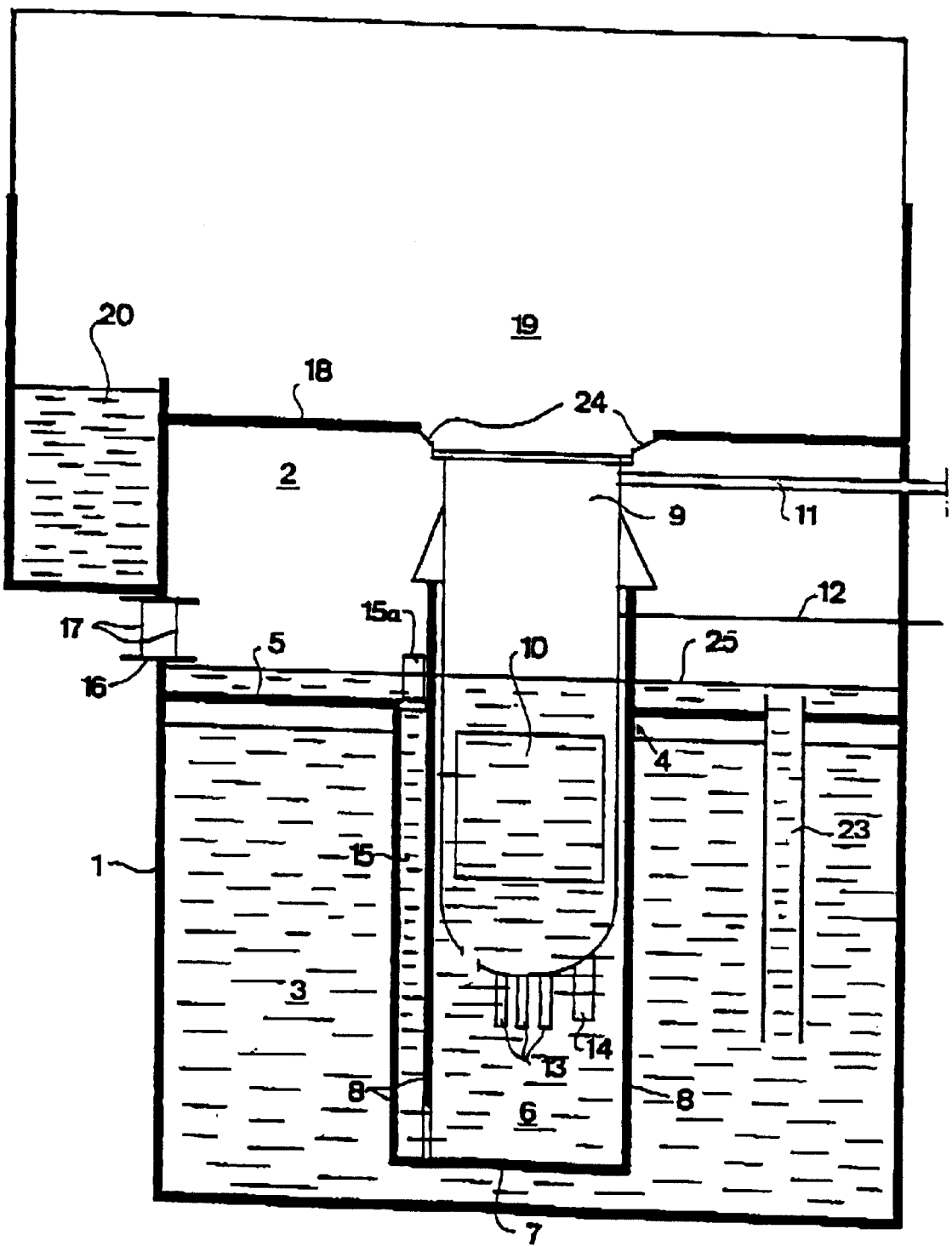
FIG. 2 discloses a section through the nuclear reactor plant in FIG. 1 after an accident

In FIG. 2, the first cover 21 and the second cover 22 are in order to, for instance, enable maintenance or revision of the nuclear reactor plant. One wall portion 24 extends around the upper part of the reactor vessel 9 and connects the reactor vessel 9 to the upper limiting wall 18 in such a manner that the primary space 2 is separated from the upper space 19. Furthermore, in FIG. 2 is disclosed that one of the pump devices 14 has been dismounted by mistake in such a manner that the reactor vessel 9 has an opening or a hole at its bottom portion. The liquid present in the reactor vessel 9 will flow therethrough out of the reactor vessel 9 and down into the cavity 6. Since the reactor vessel 9 is open upwardly against the upper space 19, the liquid present in the upper space 19 will flow downwardly through the reactor vessel 9 an fill it to the same degree as the liquid flows out through the opening at the bottom portion. Thus, the liquid level in the cavity 6 will rise until it reaches the final liquid level 25 disclosed in FIG. 2. As appears from FIG. 2, the final water level 25 is located above the most highly located part of the reactor core 10, i.e. above the upper edge of the reactor core 10.

This means that the reactor core 10 still is completely submerged in water. Thereby, in spite of an opening at the bottom portion of the reactor vessel 9, one may ensure cooling of the reactor core 10.

It is to be noted that the arrangement according to the invention relies on completely passive measures, i.e. there is no precondition that pumps or other actively driven members operate in order to supply liquid to the interior of the reactor vessel 9 in case of a leakage at the bottom portion of the reactor vessel 9.

The present invention is not limited to the embodiment disclosed but may be varied and modified within the scope of the following claims. For instance, it is to be noted that more than one transport passage may be provided in order to ensure sufficient evacuation capacity for the staff located in the cavity 6 in case of the scenario described above. Although the embodiment disclosed refers to a boiling water reactor, it is to be noted that the principles according to the invention also are applicable to other types of nuclear reactors, in particular light water reactors, such as a pressure water reactor.

According to the embodiment disclosed, the inventive casing 1 forms the reactor containment of the plant. However, it is to be noted that the casing 1, within the scope of the invention, may form a separate casing which is separated from the reactor containment provided according to conventional technique and which may be provided either inside or outside the reactor containment. For instance, the casing 1 may be formed by a reactor building.

What is claimed is:

1. A nuclear reactor plant comprising:
   a casing enclosing a primary space;
   a reactor vessel, arranged in the primary space;
   a reactor core provided in the reactor vessel;
   at least one reactor component sealingly and releasably provided in a through-going opening at a bottom portion of the reactor vessel,
   wherein said reactor component comprises at least one of a pump device arranged to recirculate liquid within an interior of the reactor vessel, and a driving member arranged to displace a control rod into and out of the reactor core for controlling a nuclear reaction in the reactor core;

an upper space provided above the primary space; and a wall portion separating said primary space from said upper space, the reactor core being separated from the upper space by means of an openable cover arrangement, wherein the primary space is limited downwardly by a floor member and a cavity which is open upwardly and extends downwardly from the floor member, and wherein the reactor vessel is at least partly provided within the cavity and said reactor component is provided within the cavity, wherein the casing is designed in such a manner that the primary space is completely closed against the environment at least to a level corresponding to the most highly located part of the reactor core, that the upper space is arranged to house a volume of a liquid, which volume is sufficiently large to permit the filling of the primary space with said liquid to a level reaching at least the most highly located part of the reactor core, and that at least one transport passage extends between the lower part of the cavity and the part of the primary space located above the floor member, said transport passage comprising means for transporting people and material.

2. A nuclear reactor plant according to claim 1, characterized in that the reactor vessel is provided in the primary space in such a manner that it extends downwardly into the cavity to such a level that the most highly located part of the reactor core is located in the cavity below the floor member.

3. A nuclear reactor plant according to claim 1, characterized in that the cavity is defined by a bottom portion and a wall portion which delimit completely the cavity from the surrounding parts of the casing up to the level at which the floor member is located.

4. A nuclear reactor plant according to claim 1, characterized in that the casing also encloses a secondary space separated from the primary space and provided below the floor member and arranged to house a cooling medium.

5. A nuclear reactor plant according to claim 4, characterized by at least one channel extending through the floor member and connecting the primary space to the secondary space and that said channel has an orifice provided in the secondary space and arranged to be located in said cooling medium.

6. A nuclear reactor plant according to claim 1, characterized in that the primary space is accessible from outside via an openable passage, extending through the casing at a level located above the floor member.

7. A nuclear reactor plant according to claim 1, characterized in that the cover arrangement comprises a first cover arranged to close an upper limiting wall of the primary space and second cover arranged to close the reactor vessel.

8. A nuclear reactor plant according to claim 1, characterized in that the casing is arranged to be permanently closed against the environment up to said level during the operation of the plant and when the plant is shut down.

* * * * *